United States Patent [19]
Fernholz et al.

[11] 3,903,139

[45] Sept. 2, 1975

[54] PROCESS FOR THE MANUFACTURE OF ALLYL ACETATE

[75] Inventors: Hans Fernholz, Fischbach, Taunus; Hans-Joachim Schmidt, Falkenstein, Taunus; Friedrich Wunder, Florsheim am Main, all of Germany

[73] Assignee: Hoechst Aktiengesellschaft, Frankfurt am Main, Germany

[22] Filed: Dec. 5, 1972

[21] Appl. No.: 312,380

[30] Foreign Application Priority Data
Dec. 7, 1971  Germany............................ 2160649

[52] U.S. Cl. .......................... 260/497 A; 252/431 C
[51] Int. Cl. .............................................. C07c 67/04
[58] Field of Search ................................ 260/497 A

[56] References Cited
UNITED STATES PATENTS

| | | |
|---|---|---|
| 3,637,819 | 1/1972 | Sennewald et al............. 260/497 A |
| 3,658,888 | 4/1972 | Hornig et al................... 260/497 A |

FOREIGN PATENTS OR APPLICATIONS

| | | | |
|---|---|---|---|
| 1,911,178 | 9/1970 | Germany ....................... | 260/497 A |

*Primary Examiner*—Lorraine A. Weinberger
*Assistant Examiner*—Richard D. Kelly
*Attorney, Agent, or Firm*—Curtis, Morris & Safford

[57] ABSTRACT

Process for the manufacture of allyl acetate in the gaseous phase from propylene, oxygen and acetic acid in the presence of a catalysts containing palladium, alkali metal acetate and a copper and/or vanadium salt of a 1,3-dicarbonyl compound.

4 Claims, No Drawings

PROCESS FOR THE MANUFACTURE OF ALLYL ACETATE

The present invention relates to a process for the manufacture of allyl acetate in the gaseous phase.

It has been proposed to react propylene in the gaseous phase with acetic acid and oxygen to yield allyl acetate using supported catalysts containing palladium or palladium salts and further additives such as gold, gold salts, bismuth, bismuth salts, cadmium, cadmium salts, alkaline earth metal salts, and alkali metal salts. As promoters there have been mentioned salts of copper, vanadium, manganese, chromium, iron, molybdenum, and tungsten. In the case of copper, the acetate, propionate, chloride, bromide and hydroxide and in the case of vanadium sodium vanadate and ammonium vanadate have been described.

When catalysts are prepared with these salts good yields can be obtained for short periods of time, but they diminish rapidly so that the catalysts have to be replaced after a few hours. Regeneration of these catalysts has not been possible so far.

It has now been found that with the addition of copper and vanadium compounds, the drop in the catalyst yield can surprisingly be avoided when copper and/or vanadium salts of definite anions are used and very effective catalysts having a nearly unlimited lifetime are obtained.

The present invention provides a process for the manufacture of allyl acetate in the gaseous phase by reacting propylene, oxygen, or oxygen containing gases and acetic acid at elevated temperature in the presence of catalysts containing palladium and alkali metal acetate, which comprises using a catalyst containing of from 0.1 to 20 % by weight of a copper and/or vanadium salt of compounds of the general formula

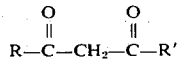

in which R and R' each represent an aliphatic, aromatic, or alkoxyl radical, preferably the salts of acetylacetone, acetoacetic ester and benzoylacetone, or mixtures thereof.

By using a mixed catalyst of the aforesaid type, a yield of allyl acetate of over 97 %, calculated on the reacted propylene, is obtained. It is surprising that the very high space-time-yields combined with an extremely long life time of the catalysts are almost independent of the water content of the acetic acid used.

The space-time-yield is nearly unchanged and constant over a period of several months independent of whether pure acetic acid or acetic acid of 15 % strength is used. According to a preferred embodiment of the invention the acetic acid used is almost quantitatively transformed into allyl acetate during one passage through the reactor, and thus separation of the acetic acid is not necessary.

Catalysts suitable to carry out the process of the invention are obtained by impregnating an inert carrier material with the solution of the active components, either simultaneously or successively, and subsequently drying the catalysts.

As carrier material for the catalyst there can be used very different inert materials such as, for example, active carbon, titanium dioxide, titanium silicate, zirconium oxide, zirconium phosphate, zirconium silicate, aluminum oxide, furthermore silicates such as burnt clay or aluminum silicates, as well as silicic acid. Especially suitable are carriers, preferably silicic acid, having a specific surface in the range of from 10 to 500m²/g, preferably 40 to 300 m²/g, and a mean pore radius ranging from 50 to 2,000 A, especially favorable results being obtained with carriers having two distinct maxima of pore distribution in the lower and upper range of the pore radii.

Suitable salts for making the catalysts to be used in the process of the invention are, for example, palladium acetate, palladium acetylacetonate, as well as potassium acetate and the salts of 1.3 dicarbonyl compounds of copper and vanadium, for example copper acetylacetonate, copper benzoyl acetonate, the copper salt of acetoacetic ester, vanadyl acetylacetonate, vanadium (III)-acetylacetonate, as well as the corresponding vanadium salts of benzoyl acetone and acetoacetic ester, vanadyl, benzoylacetonate, vanadyl salt of acetoacetic ester, vanadium (III)-benzoylacetonate, vanadium (III) salt of acetoacetic ester or mixtures thereof.

Mixtures of copper and vanadium salts of 1,3-dicarbonyl-compounds yield catalysts which are more stable than comparative catalysts.

Suitable solvents to apply the salts to the carrier material are, for example, acetic acid, water, benzene, or mixtures thereof. The process of the invention is carried out in the gaseous phase at reaction temperatures in the range of from 0° to 300°C, preferably 120° to 220°C, and at pressure ranging from 0 to 35 atmospheres gage, preferably 2 to 10 atmospheres gage.

Oxygen can be used in pure elemental form or in admixture with inert gases, for example in the form of air of an oxygen/ carbon dioxide mixture.

When the process is carried out on an industrial scale, the propylene/oxygen mixture should be outside the known explosion ranges. During the starting period of the catalyst oxygen is preferably added in such a manner that the oxygen partial pressure is slowly increased.

By these measures a considerably improved catalyst yield is obtained in the manufacture of allyl acetate. This higher yield could be explained by the formation of an especially active form of the catalyst which cannot be obtained when the oxygen pressure is more rapidly increased in the short period of time.

When the process of the invention is carried out on an industrial scale it proved especially suitable to recycle continuously the unreacted starting products into the reactor after complete or partial removal of the reaction products; as inert gas carbon dioxide formed in small amounts being suitable. The consumed proportion of the starting products is replenished.

The reaction is carried out in the presence of an alkali metal acetate; preferred amounts of the acetate being in the range between 0.1 and 25 % by weight, preferably 1 to 10 % by weight, calculated on the weight of the mixed catalyst consisting of carrier material and catalytically active substances.

According to an especially favorable embodiment the alkali metal acetates are added to the catalyst during the course of the reaction either continuously or discontinuously, with continuous addition the alkali metal acetates being added in an amount of from 0.1 to 400 ppm, preferably 1 to 100 ppm calculated on the acetic acid used.

The process of the invention can be carried out in a fixed bed or fluidized bed reactor whereby selectivity and yield may be further improved. By fluidized bed there is understood the use of a fine grained catalyst, particles of which are kept is constant movement by the reaction gases whereby the catalyst acquires the properties of a "quasi-liquid" and accumulations of heat are avoided. Carriers suitable for this mode of operation have globular (microspherical) particles with a particle diameter of from 0.08 to 2 mm, especially 0.1 to 0.2 mm.

The following examples illustrate the invention; the gaseous components were measured under normal conditions of pressure and temperature.

EXAMPLE 1 (Comparative example)

450 g (1 l) of a silicic acid carrier were impregnated with a solution of 13 g palladium(II) acetate, 46,5 g potassium acetate and 9 g copper(II) acetate in 340 ml acetic acid and dried. The catalyst thus obtained contained 1.2 % palladium, 0.5 % copper and 3.8 % potassium in the form of their acetates.

One liter of the catalyst obtained was filled into a reaction tube having an inner diameter of 32 mm, provided with evaporator, condenser, receiver and a device for maintaining the pressure. Under a pressure of 5 atmospheres gage and at a catalyst temperature of 178° to 180°C a gaseous mixture consisting of 870 g of acetic acid, 850 liters propylene and 75 liters oxygen was passed per hour over the catalyst. Analysis of the condensate obtained after constant conditions had adjusted and of the non-condensed gases indicated a space-time-yield of initially 135 to 142 g allyl acetate per liter of catalyst per hour, which dropped after about 250 hours in operation to 35 g allyl acetate per liter of catalyst per hour. With a maximum space-time-yield 91.5 % of the reacted propylene were obtained as allyl acetate and 8.5% as carbon dioxide.

EXAMPLE 2 (Comparative example)

450 g(1 l) of a silicic acid carrier were impregnated with a solution of 17 g copper(II) salicylate, 13 g palladium(II) acetate and 46.5 g potassium acetate in 330 ml acetic acid and dried. The catalyst thus prepared contained 1.2 % palladium, 3.8 % potassium in the form of their acetates and 0.5 % copper as salicylate.

Under the conditions specified in Example 1, 3: gaseous mixture consisting of 480 g acetic acid, 120 g water, 850 liters propylene and 75 liters oxygen was passed per hour over 1 liter of the catalyst obtained. The maximum space-time-yield obtained after constant conditions had adjusted was 120 to 125 g allyl acetate per liter of catalyst per hour, the selectivity being 92 %. After 250 hours in operation, the space-time-yield had dropped below 20 g allyl acetate per liter of catalyst per hour.

EXAMPLE 3 (Comparative example)

450 g of the silicic acid carrier specified in Example 1 were impregnated with a solution of 13 g palladium acetate and 46.5 g potassium acetate in 350 ml acetic acid and dried. Subsequently, the carrier was impregnated with a solution of 7 g copper(II) chloride in 340 ml of water and dried. The catalyst obtained contained 1.2 % palladium and 3.8 % potassium in the form of their acetates and 0.5 % copper as chloride.

Under the conditions specified in Example 1, a gaseous mixture of 870 g acetic acid, 850 liters propylene and 75 liters oxygen was passed per hour over 1 liter of the catalyst obtained. The maximum space-time-yield was only 28 to 30 g allyl acetate per liter of catalyst per hour and the selectivity was below 50 %.

EXAMPLE 4

450 g of the silicic acid carrier used in the preceding examples were impregnated with a solution of 13 g palladium(II) acetate, 46.5 g potassium acetate and 10.5 g copper(II) acetylacetonate in 340 ml acetic acid and dried. The catalyst thus obtained contained 1.2 % palladium and 3.8 % potassium as acetates and 0.5 % copper as acetylacetonate.

1 l of the catalyst obtained was filled into the reactor described in Example 1 and under a pressure of 5 atmospheres gage and at a reactor temperature of 178° to 180°C a gaseous mixture consisting of 870 g of anhydrous acetic acid, 850 l propylene and 75 l oxygen was passed per hour over the catalyst. Under these conditions 255 to 267 g allyl acetate were obtained per hour. After 1400 hours in operation the space-time-yield was still above 240 g allyl acetate per liter of catalyst per hour. The selectivity was in the range of from 97 to 97.5 %.

EXAMPLE 5

Over 1 liter of fresh catalyst having the composition specified in Example 4 a mixture of 160 g acetic acid, 220 g water, 850 l propylene and 75 l oxygen was passed per hour under otherwise identical conditions. The condensate obtained by cooling the gases leaving the reactor separated in two phases. Examination of these two phases and of the non-condensed off-gases indicated a space-time-yield of 253 to 258 g allyl acetate per liter of catalyst per hour with a selectivity of 97 %. After 1,000 hours in operation the space-time-yield and the selectivity were still unchanged.

EXAMPLE 6

An apparatus with gas circulation consisting of a reaction tube having a length of 4.8 meters and a diameter of 32 millimeters, cycle gas compressor, evaporator, condenser and condensation vessel was used. The oxygen was added to the cycle gas prior to evaporation. Fresh propylene was supplied at the suction side of the compressor. The carbon dioxide formed as byproduct was removed from the system as off-gas and a carbon dioxide concentration of about 50 % by volume was maintained in the feed gas.

The reactor was filled with 3.6 liters of the catalyst specified in Example 4. After a starting period of about 24 hours, during which the oxygen content in the reaction mixture was increased from 2 % by volume to 7.4 % by volume, 8.3 cubic meters of a reaction mixture consisting of about 4.8 % by volume of acetic acid, 12.6 % by volume water, 20.4 % by volume propylene, 54.8 % by volume carbon dioxide and 7.4 % by volume oxygen were introduced per hour into the reactor under a pressure of 7 atmospheres gage and at 180°C. To compensate losses of potassium acetate about 10 ppm potassium acetate were added to the acetic acid used.

Analysis of the condensate consisting of 2 phases and of the off-gas taken from the system indicated per hour 1,740 to 1,750 g allyl acetate, corresponding to a space-time-yield of about 495 g allyl acetate per liter of catalyst per hour. After 4,000 hours the catalyst yield was still unchanged. The yield of allyl acetate, calculated on the reacted propylene, was 97 % on the average.

EXAMPLES 7 to 14

In the apparatus used in Example 1, a gaseous mixture of 480 g acetic acid, 120 g water, 850 liters propylene and 75 liters oxygen on the average was passed per hour over 1 liter each of the catalysts specified in the following table. In the table there are also indicated the maximum space-time-yields (STY) in grams allyl acetate per liter of catalyst per hour obtained and the space-time-yield obtained after 500 hours in operation.

| Example | Catalyst | % Cu/V | Cu-or V-salt, respectively | STY g/l.h maximum | STY g/l.h after 500 hrs |
|---------|----------|--------|----------------------------|-------------------|-------------------------|
| 7 | A | 0.5 | copper benzoyl acetonate | 205 | 193 |
| 8 | B | 0.3 | copper acetoacetic ester salt | 185 | 176 |
| 9 | C | 1.1 | vanadyl acetylacetonate | 272 | 255 |
| 10 | D | 0.5 | vanadium(III)acetylacetonate | 247 | 238 |
| 11 | E | 0.3 / 0.5 | copper acetoacetic ester salt / vanadyl acetylacetonate | 256 | 242+ |
| 12 | F | 0.5 | copper citrate | 143 | 26 |
| 13 | G | 0.5 | ammonium vanadate | 35 | 15 |
| 14 | H | 0.5 | vanadyl sulfate | 18 | 10 |

+time of operation 225 hrs.

Catalysts A to H were prepared in the following manner; catalysts A to E corresponding to the process according to the invention while catalysts F to H are comparative catalysts.

Catalyst A 450 g of the silicic acid carrier used in the preceding examples were impregnated with a solution of 13 g palladium acetate, 46.5 g potassium acetate, and 16.1 g copper benzoyl acetonate in 350 ml glacial acetic acid and dried. The catalyst obtained contained 1.2 % palladium and 3.8 % potassium in the form of their acetates and 0.5 % copper as benzoyl acetonate.

Catalyst B

The catalyst was prepared in the same manner as A with the exception that 7.3 g copper salt of acetoacetic ester were used instead of copper benzoyl acetonate. The catalyst thus obtained contained 1.2 % palladium, 3.8 % potassium in the form of their acetates and 0.3 % copper as acetoacetic ester salt.

Catalyst C 450 g of the carrier specified in the preceding examples were impregnated with a solution of 30.5 g vanadyl acetylacetonate in 380 ml 50 % acetic and dried. 13 g palladium acetate and 46.5 g potassium acetate were dissolved in 335ml acetic acid, the vanadium containing catalyst was impregnated therewith and dried. The catalyst obtained contained 1.2 % palladium and 3.8 % potassium in the form of their acetates as well as 1.1 % vanadium in the form vanadyl acetyl acetonate.

Catalyst D 450 g of silicic acid carrier specified in the preceding examples were impregnated with a solution of 18 g vanadium(II) acetylacetonate in 370 ml acetic acid and dried. A solution of 13 g palladium acetate and 46.5 potassium acetate in 340 ml acetic acid was applied to the catalyst and the whole was dried again. The catalyst then contained 1.2 % palladium and 3.8 % potassium in the form of their acetates as well as 0.5 % vanadium in the form of vanadium(III) acetylacetonate.

Catalyst E 450 g of the silicic acid carrier as defined in the preceding examples were impregnated with a solution of 13 g vanadyl acetylacetonate in 370 ml acetic acid and dried. 13 g palladium acetate, 46.5 g potassium acetate and 7.3 g of the copper salt of acetoacetic ester were dissolved in 340 ml acetic acid and the vanadium containing carrier was impregnated therewith. After drying, the catalyst obtained contained 1.2 % palladium and 3.8 % potassium in the form of their acetates, 0.5 % vanadium as vanadyl acetylacetonate and 0.3 % copper in the form of the acetoacetic ester salt.

Catalyst F 9 g of copper citrate were dissolved in 410 ml of water and 450 g of the specified silicic acid carrier were impregnated therewith. After drying, the catalyst was impregnated with a solution of 13 g palladium acetate and 46.5 g potassium acetate in 350 ml of 50 % acetic acid and dried again. The catalyst thus obtained contained 1.2 % palladium and 3.8 % potassium in the form of their acetates as well as 0.5 % copper as citrate.

Catalyst G 450 g the above mentioned silicic acid carrier were impregnated with a solution of 6 g ammonium vanadate in 410 ml of water and dried. The catalyst was then impregnated with a solution of 13 g palladium acetate and 46.5 g potassium acetate in 350 ml acetic acid and the whole was dried. The catalyst obtained contained 1.2 % palladium, 3.8 % potassium in the form of their acetates and 0.5 % vanadium as ammonium vanadate.

Catalyst H 8.5 g vanadyl sulfate were dissolved in 410 ml of water and the solution was applied to 450 g of the afore-specified silicic acid carrier. After drying, the carrier was impregnated with a solution of 13 g palladium acetate and 46.5 g potassium acetate in 350 ml acetic and dried again. The catalyst obtained contained 1.2 % palladium and 3.8 % potassium in the form of their acetates and 0.5 % vanadium in the form of vanadyl sulfate.

What is claimed is:

1. A process for making allyl acetate by reacting propylene, oxygen or oxygen containing gases and acetic acid in the gaseous phase at a temperature of from 0° to 300°C and pressure of from 0 to 35 atmospheres gage in the presence of a catalyst consisting essentially of palladium salts, 0.1 to 25% by weight alkali metal acetate and 0.1 to 20% by weight of a copper and/or vanadium salt selected from the group consisting of copper acetylacetonate, copper benzoyl acetonate, copper salt of acetoacetic ester, vanadyl acetylacetonate, vanadyl benzoylacetonate, vanadyl salt of acetoacetic ester, vanadium (III)-acetylacetonate, vanadium (III) benzoylacetonate, vanadium (III) salt of acetoacetic ester and mixtures thereof.

2. The process of claim 1, wherein the catalyst contains the copper salt or vanadium salt of acetylacetone or a mixture thereof.

3. The process of claim 1, wherein the catalyst contains the copper salt or vanadium salt of acetoacetic ester or a mixture thereof.

4. The process of claim 1, wherein the catalyst contains the copper salt or vanadium salt of benzoyl acetone or a mixture thereof.

* * * * *